United States Patent [19]

Damle et al.

[11] Patent Number: 5,155,139
[45] Date of Patent: Oct. 13, 1992

[54] NON-CHALKING BLOWING AGENT FOR FOAMED POLYMERS

[75] Inventors: Pradeep D. Damle; Jawad H. Murib, both of Cincinnati, Ohio

[73] Assignee: Quantum Chemical Corporation, New York, N.Y.

[21] Appl. No.: 861,679

[22] Filed: Apr. 1, 1992

Related U.S. Application Data

[62] Division of Ser. No. 796,493, Nov. 22, 1991.

[51] Int. Cl.$^5$ ................................................. C08V 9/06
[52] U.S. Cl. ..................................... 521/85; 521/142; 521/143; 521/147; 521/180; 521/146
[58] Field of Search ................. 521/85, 143, 142, 147, 521/180, 146

[56] References Cited

U.S. PATENT DOCUMENTS

| | | | |
|---|---|---|---|
| 3,331,790 | 7/1967 | Scheurlen | 521/85 |
| 3,819,672 | 6/1974 | Joslyn | 521/138 |
| 3,823,098 | 6/1974 | Joslyn | 521/111 |
| 4,394,458 | 7/1982 | Wade | 54/85 |
| 4,397,948 | 8/1983 | Wade | 521/85 |
| 4,399,238 | 8/1983 | Wade | 521/85 |
| 4,560,706 | 12/1985 | Burton et al. | 521/85 |

*Primary Examiner*—Morton Foelak
*Attorney, Agent, or Firm*—Kenneth D. Tremain; William A. Heidrich

[57] ABSTRACT

A method of making a foamed polymer article by injection molding, using a foaming agent that does not form byproducts which could pit or chalk the polymer surface. The foaming agent contains sodium borohydride in an amount from 0.01 to 5.0 weight percent of the polymer, and sodium dihydrogen phosphate as an activator to react with the sodium borohydride and produce hydrogen gas. The sodium borohydride and the sodium dihydrogen phosphate are kept separated from direct contact with each other, such as by encapsulating the components, until gas production is desired when the polymer is heated.

8 Claims, No Drawings

NON-CHALKING BLOWING AGENT FOR FOAMED POLYMERS

CROSS-REFERENCE TO RELATION APPLICATION

This is a divisional of application Ser. No. 07/796,493, filed Nov. 22, 1991.

BACKGROUND OF THE INVENTION

1. Field of the Invention

This invention relates generally to foamed polymer products. More particularly, the invention concerns a chemical foaming agent and a method of using such agent to make molded foamed polymer articles.

2. Description of the Related Art

Foaming agents, also known as blowing agents, are used during processing of polymers to achieve a cellular structure in the final product. As described in the article "Foaming Agents" in *Modern Plastics Encyclopedia* (Mid-October 1989 Issue Volume 66, Number 11), chemical blowing agents (CBAs) are substances that decompose at elevated temperatures or through chemical reaction and form gaseous composition products. Reasons given for the use of foaming agents include weight reduction for savings in cost and material, better properties such as insulation against heat or noise, different surface appearances, improved stiffness, and different electrical properties.

One widely used inorganic chemical blowing agent is sodium borohydride ("SBH"). As explained in U.S. Pat. No. 4,769,397 to Lapierre et al., SBH reacts with water or some other proton donor or "activator" to release gas for foaming. That patent describes an activation system comprising a mixture of sodium bicarbonate and citric acid which reacted to evolve water and carbon dioxide.

In some applications the use of a sodium bicarbonate/citric acid activation system has been associated with a phenomenon known as "chalking," in which a white material believed to be borax and sodium carbonate forms on the surface of a molded part. One object of this invention is to provide an improved activator for SBH to avoid chalking problems.

Commercially available foaming agents are typically in the form of concentrates: active ingredients encapsulated in a carrier resin. Another object of this invention is to provide an improved foaming agent concentrate which is stable during storage.

SUMMARY OF THE INVENTION

The invention concerns a foamable polymeric composition comprising a polymer to be foamed and a foaming agent. The agent contains an alkali metal borohydride such as sodium borohydride in an amount from 0.01 to 5.0 weight percent of the polymer, and an amount of sodium dihydrogen phosphate sufficient to react with the sodium borohydride and produce gas. The sodium borohydride and the sodium dihydrogen phosphate are kept isolated from direct contact with each other, such as by encapsulating the components, until gas production is desired.

DETAILED DESCRIPTION OF THE INVENTION

Novel foaming agents and methods for making foamed injection-molded articles using such compositions are described below. In the method of the invention, a foaming agent comprising SBH, an activator for the SBH, and a polymer to be foamed are all fed to an injection molding machine. The polymer melts as it moves through the machine's barrel and is mixed with the SBH and activator. The SBH and activator react in this mixture and evolve gas, resulting in a foamed polymer article.

Sodium Borohydride

Sodium borohydride ("SBH") is available from Morton International of Danvers, Mass. To protect the SBH from contact with moisture or from other conditions which would cause a premature reaction, the SBH is preferably encapsulated in a carrier resin.

Borohydrides of other alkali metals such as lithium, potassium, rubidium, and cesium should be considered equivalents and can be used in this invention, although sodium borohydride is preferred.

Sodium Dihydrogen Phosphate

Although SBH can react with many possible proton donor activators to evolve a hydrogen gas, the choice of a suitable activator for use in foamed polymer products is more limited.

Not only must the activator function at the intended polymer processing conditions, but it should have no undesirable characteristics such as handling attributes, effects on processing equipment, or appearance in the final foamed product. An activator ideally should be non-volatile under the reaction conditions encountered during mixing and molding and should not form corrosive byproducts in reaction with the sodium borohydride. Both the activator and its reaction products with SBH should be dispersible in the polymer to be foamed.

Unexpectedly it has been found that sodium dihydrogen phosphate will function well as an activator for SBH. Sodium dihydrogen phosphate, sometimes referred to as monobasic sodium phosphate, sodium acid phosphate, monobasic sodium orthophosphate, or sodium biphosphate, is a white powder that is stable until reacted with the SBH. This offers an advantage over dual-component activator systems such as sodium bicarbonate/citric acid in which the activator components may contact each other during encapsulation and can evolve water prematurely.

Foaming Agent

The foaming agent comprises SBH and the activator. The amount of the agent used to foam a polymer will depend upon the desired density of the foamed product, i.e., the amount of foaming desired. Generally the concentration of SBH is low, ranging from 0.01 to 5.0, preferably 0.1 to 3.0, most preferably 0.1 to 0.3 percent by weight of the polymer to be foamed. Too little SBH and/or insufficient activator will produce insufficient foaming, while excess SBH will cause collapse of the cells in the foamed structure.

The amount of activator should be sufficient to react with the SBH and thereby cause at least some foaming of the polymer. In determining the relative amounts of activator and SBH in the blowing agent composition, the activator is advantageously available in at least stoichiometric amounts based upon the proton donor content of the activator. The reaction is expected to proceed according to the following formula:

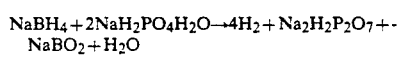

Anhydrous sodium dihydrogen phosphate may also be used, at greater expense. The molar ratio of sodium dihydrogen phosphate to SBH can range widely but is preferably to 1:1 to 4:1, more preferably about 2:1 to 2.5:1. A slight excess amount of activator is preferred, primarily for economic reasons, to maximize the potential of the relatively expensive SBH.

The SBH and the activator should be separated from direct contact with each other until gas production is desired. Separation of these components can be accomplished by known means. For example, the individual components can each be fed to the machine by separate hoppers or feed systems so that they contact each other only inside the extruder barrel. Encapsulation of one or both of the foaming agent components in a carrier resin is preferred. The encapsulated components can then be premixed.

The encapsulating or carrier resin may be polystyrene, polyethylene, polypropylene or any other resin that is compatible with the processing conditions of the polymer to be foamed and that does not adversely affect the desired characteristics of the foamed article. Ideally the carrier resin is the same material as the polymer to be foamed.

Encapsulated SBH is commercially available from Quantum Chemical Corporation, USI Division, for example FM1776H which is 10% by weight SBH in a polystyrene carrier. The sodium dihydrogen phosphate is conveniently encapsulated by melt-blending with a polyolefin and then pelletizing to form a concentrate which preferably consists of up to 50%, more preferably about 40%, by weight of the activator.

Method of Foaming Resin

The foaming agent of this invention can be used in almost any thermoplastic resin. Among the more commonly foamed resins are ethylene and propylene homopolymers and copolymers, polystyrene, acrylonitrile-butadiene-styrene (ABS), poly(phenylene oxide) (PPO), and poly(phenylene ether) (PPE).

The amount of foaming agent relative to the polymer to be foamed is preferably large enough to be easily and precisely measured, but small enough so that the agent (and particularly the carrier resin) will constitute a small percentage of the polymer. The exact amount is open to choice, but generally about 0.1–3.0 parts by weight of the foaming agent (consisting of encapsulated SBH and the encapsulated activator) are present per 100 parts by weight of the resin to be foamed. About 2 parts per hundred are preferred.

In the method of making a foamed injection-molded article according to the invention, the foaming agent is dispersed into polymer such as by conventional dry blending. The polymer and foaming agent mixture is heated to a molten state whereby the foaming agent components react and evolve gas. The mixture is subsequently injected into a mold where it expands and cools into a molded foamed article.

EXAMPLE

Sodium borohydride concentrate FM1776H was obtained from Quantum Chemical Corporation, USI Division. This pellet form concentrate was prepared by melt compounding with polystyrene and consists of 10 percent by weight SBH.

The activator was dispersed in a carrier resin by the following procedure. About 2.5 lbs. of PETROTHENE NA279 low density polyethylene (LDPE) from Quantum Chemical Corporation was milled on a two-roll mill at 280° F. until it formed a continuous crepe. An equal amount of sodium dihydrogen phosphate was gradually added to the crepe at the nip of the two rolls. The composition was milled for five minutes, at which time the sodium dihydrogen phosphate had dispersed in the LDPE matrix. The crepe was removed from the mill and cooled to room temperature and then ground to a powder.

A mixture of 380 grams of the polystyrene-encapsulated SBH and 552 grams of the polyethylene-encapsulated activator was prepared by tumble blending. This mixture was then tumble blended with 2134 grams of impact grade polystyrene. The blend was then injection molded into specimens at 425° to 440° F. using an extruder.

The molded samples exhibited 28.6% lower density than the corresponding unfoamed polystyrene under identical conditions, 0.75 versus 1.05 g/cc. No pitting or chalking was noticed after several weeks storage at ambient conditions.

We claim:

1. A foamable polymeric composition comprising:
   a polymer;
   sodium borohydride in an amount from 0.01 to 5.0 weight percent of the polymer; and
   an amount of sodium dihydrogen phosphate sufficient to react with the sodium borohydride and produce gas, the sodium borohydride and the sodium dihydrogen phosphate being separated from direct contact with each other until gas production is desired.

2. The composition of claim 1 containing from one to four moles sodium dihydrogen phosphate per mole of sodium borohydride.

3. The composition of claim 2 containing from 2 to 2.5 moles sodium dihydrogen phosphate per mole of sodium borohydride.

4. The composition of claim 1 in which the sodium borohydride and sodium dihydrogen phosphate are separately encapsulated in a carrier resin prior to contacting the polymer to be foamed.

5. The composition of claim 4 in which the carrier resin is selected from the group consisting of polystyrene, polyethylene, and polypropylene.

6. The composition of claim 4 in which the sodium borohydride comprises about 10 weight percent of the resin-encapsulated sodium borohydride.

7. The composition of claim 4 in which the sodium dihydrogen phosphate comprises from 40 to 50 weight percent of the resin-encapsulated sodium dihydrogen phosphate.

8. The composition of claim 1 in which the polymer is selected from the group consisting of ethylene and propylene homopolymers and copolymers, polystyrene, acrylonitrile-butadiene-styrene, poly(phenylene oxide), and poly(phenylene ether).

* * * * *